United States Patent [19]

Klein et al.

[11] 4,425,719
[45] Jan. 17, 1984

[54] COMPACT AIR BAR ASSEMBLY FOR CONTACTLESS WEB SUPPORT

[75] Inventors: David M. Klein; Richard J. Wimberger, both of DePere; Michael O. Rocheleau; Randall D. Helms, both of Green Bay, all of Wis.

[73] Assignee: W. R. Grace & Co., New York, N.Y.

[21] Appl. No.: 357,848

[22] Filed: Mar. 15, 1982

[51] Int. Cl.³ .............................................. F26B 13/20
[52] U.S. Cl. ....................................... 34/156; 34/155; 34/160
[58] Field of Search ................... 34/155, 156, 160, 23; 226/97

[56] References Cited

U.S. PATENT DOCUMENTS 3,739,491  6/1973  Creapo et al. ......................... 34/156

FOREIGN PATENT DOCUMENTS

232473  1/1961  Australia ............................... 34/156
1486555  9/1977  United Kingdom .
1572805  8/1980  United Kingdom .

Primary Examiner—Larry I. Schwartz
Attorney, Agent, or Firm—James E. Nilles

[57] ABSTRACT

An assembly of air bars from which air is blown against a lengthwise moving web to contactlessly confine it to a plane comprises a header having a ported wall extending along its full length, parallel to said plane. Each of a series of outlet ports along the ported wall opens into an air bar intermediate its ends. A centrifugal blower has its cylindrical rotor near a rear end of the header, spaced to the side of said ported wall remote from the plane. An internal plenum chamber in the header opens to the outlet ports in the rear one-third to one-half of the header. The blower has one outlet near the rotor periphery from which air flows into the front part of the header and another outlet, spaced at a greater distance from the rotor periphery, from which air flows into said plenum chamber. The header is movable toward and from said plane relative to the blower, for air bar retraction to facilitate web threading.

8 Claims, 8 Drawing Figures

COMPACT AIR BAR ASSEMBLY FOR CONTACTLESS WEB SUPPORT

FIELD OF THE INVENTION

This invention relates to web drying apparatus of the type comprising a plurality of air bars to which pressure air is fed from a blower and from which streams of air are directed against a lengthwise moving web to floatingly support the web while it is heated to evaporate solvent from fresh ink or coating on it; and the invention is more particularly concerned with unusually compact apparatus for contactlessly supporting a web, comprising a blower for the row of air bars at each side of the web and an elongated header for each blower, wherein the blower discharges into one end portion of its header and the header has outlet ports at intervals all along its length, one for each air bar in its row, each such outlet port being communicated with its air bar intermediate the ends of the air bar.

BACKGROUND OF THE PRIOR ART

Prior arrangements of web drying apparatus of the general type to which this invention relates are disclosed in U.S. Pat. No. 3,873,013, issued to P. H. Stibbe in 1975 and U.S. Pat. No. 3,739,491, issued to R. W. Creapo et al in 1973, both of which have a common assignee with this application. All such apparatus provides for contactless support of a freshly imprinted or freshly coated web of paper or the like as it moves lengthwise through a dryer enclosure. The web is oriented horizontally and is floated on air streams that issue against it from a plurality of air bars arranged along its path, each extending across the width of the web. A row of air bars is located beneath the web to discharge air upwardly and levitate it, and another row is above the web, discharging downwardly to steady and guide it.

In the apparatus of each of the above mentioned patents, a single blower that supplied pressure air to all of the air bars was communicated with the air bars through a complicated and rather bulky ductwork system that was intended to cause the air flow emitted from each air bar to be uniform all along the length of it and to be substantially uniform with the air emissions from all of the other air bars. The blower delivered pressure air into one end of a delivery duct that extended parallel to the length of the web, in outwardly spaced relation to one edge of the web. At its opposite end the delivery duct discharged into a pair of elongated plenum chambers, each of which extended widthwise relative to the web, one above it, the other below it. From each of these plenum chambers a pair of headers projected along the web, in the direction opposite to that of air flow along the delivery duct. Each of the air bars below the web had connections to the two headers beneath the web, and the air bars in the row above the web were similarly connected with the two upper headers. The arrangement of the delivery duct and plenum chambers ensured a smooth, steady delivery of pressure air into each header, and each header tapered along its length to afford substantially uniform air flows at all of its air bar connections. Each air bar had its connections with its two headers at locations between its midpoint and its respective ends, to provide for discharge of an airstream that was substantially uniform all along the length of the air bar.

As stated in the introductory paragraph of Pat. No. 3,739,491, "Prior art dryers of this general character have been used with a certain degree of success but have had certain shortcomings such as frequently being of considerable size and thereby requiring excessive installation space." Elsewhere in the patent the apparatus that it discloses is described as "particularly compact" by reason of the blower being close to the air bar assemblies.

The above described arrangement probably represented the utmost in compactness that has heretofore been attainable, but it nevertheless required the dryer assembly to be substantially wider than the printing press with which the dryer was associated, inasmuch as the blower and its delivery duct had to be spaced edgewise outwardly from the web. In many press rooms floor space is limited, and while such floor space limitations tend to be more stringent in Europe than in the United States, it is always very desirable—even when not essential—that equipment occupy as little floor space as possible.

In the apparatus of each of the above mentioned patents only one blower supplied pressure air to all of the air bars. Although it would seem to be obvious that compactness is more readily achieved with a single blower than with a multiplicity of blowers, the present invention rejects the obvious in favor of employing a plurality of blowers, one for each row of air bars. The logic of the new arrangement is that one blower can be mounted above the web and one below it, so that the blowers are located within a zone defined by the width of the web. There is no reason for the plural small blowers to consume any more energy than the single large blower that they replace, and if their total cost is more than that of one large blower (which would not necessarily be the case) the difference will be more than offset by the value of the floor space conserved and by the lower cost of the more compact dryer structure.

A person skilled in this art will probably recognize immediately that a plural blower arrangement which will achieve optimum compactness widthwise of the web is one wherein there is a blower for each row of air bars and each blower discharges directly into an elongated header which in turn discharges directly into each air bar in its row. Such a person will also recognize immediately that the last described arrangement, in any of its obvious forms, is not likely to provide for uniform discharge of pressure air into the several air bars along the length of the header and is therefore likely to operate unsatisfactorily or not at all. Nevertheless, the present invention contemplates just such an arrangement, although, of course, in a form that ensures very satisfactory operation.

The present invention also achieves compactness in the direction lengthwise of the web, in that the blower for each header is located at the side of its header that is remote from the web, but the header nevertheless has outlet ports at its opposite side, at intervals all along its length, so that certain of those ports are directly opposite the blower. According to conventional wisdom, the air bars at those certain outlet ports would receive air from the blower at a substantially higher pressure, or with a substantially more turbulent or pulsing flow, than the air bars connected with other outlet ports.

The provision of a truly compact apparatus for contactless web support involves other problems that have no obvious solutions. To facilitate threading a web through the dryer, the air bars of at least one row should be retractable by movement away from the plane of the web. If the blower is to move for such retraction along with the rest of the air bar assembly, the substantial weight of the blower has to be lifted and controlled in descending motion and must be supported in the operative and retracted positions. Furthermore, there has to be space in the dryer enclosure to accommodate the blower as it moves to its retracted position. Providing space for blower movement may not be a troublesome problem when only a single web extends through the dryer, but in many cases two or more webs must extend through the dryer one above the other, requiring stacked arrays of air bars, and in such cases the need for vertical compactness may be as urgent as the need for horizontal compactness.

SUMMARY OF THE INVENTION

The general object of the present invention is to provide apparatus for contactless support of a web as it moves lengthwise through a dryer, which apparatus has a width not substantially greater than that of the web itself and a length not substantially greater than that of the stretch of web impinged by air streams issuing from the air bars of the apparatus.

More specifically, it is an object of this invention to provide apparatus of the character described wherein there is a blower for each row of air bars and each blower is communicated with the air bars of its row through an elongated header into which the blower discharges and which has outlet ports at intervals all along its length, each of said outlet ports opening into one of the air bars midway between the opposite ends of the air bar.

It is of course a further object of this invention to provide apparatus which is arranged as just described and which provides for uniform emission of air from each air bar all along its length and for like airstreams to be emitted from all of the air bars.

Another and more specific object of the invention is to provide apparatus of the character described wherein there is a centrifugal blower that has two or more pressure air outlets, and wherein certain air bars are supplied with air from one of said outlets and others from another outlet, but wherein simple means are provided for preventing pulsing, surging and turbulence of pressure air delivered to all of the air bars.

It is also a specific object of this invention to provide contactless web supporting apparatus comprising a row of air bars that are connected to an elongated header, at one side thereof, at regular intervals along its length, and wherein a centrifugal blower near a rear end of the header discharges into its opposite side so as to be directly opposite the connections of certain of the air bars with the header, and to provide means in said apparatus for ensuring that the airstreams issuing from said certain air bars ae substantially uniform with those issuing from the other air bars.

A further specific object of this invention is to provide web supporting apparatus comprising an elongated header that communicates with air bars at intervals all along its length and a centrifugal blower that discharges substantially directly into a rear end portion of the header, having simple means for reducing air pressures near the front end of the header so that air pressures are substantially uniform at the inlets to all of the air bars.

Another and very important object of this invention is to provide web supporting apparatus of the character described that lends itself well to a stacked arrangement inasmuch as an assembly comprising a row of air bars and an elongated header to which the air bars are attached is retractable relative to a stationarily mounted blower that delivers pressure air substantially directly into a rear end portion of the header.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 1:
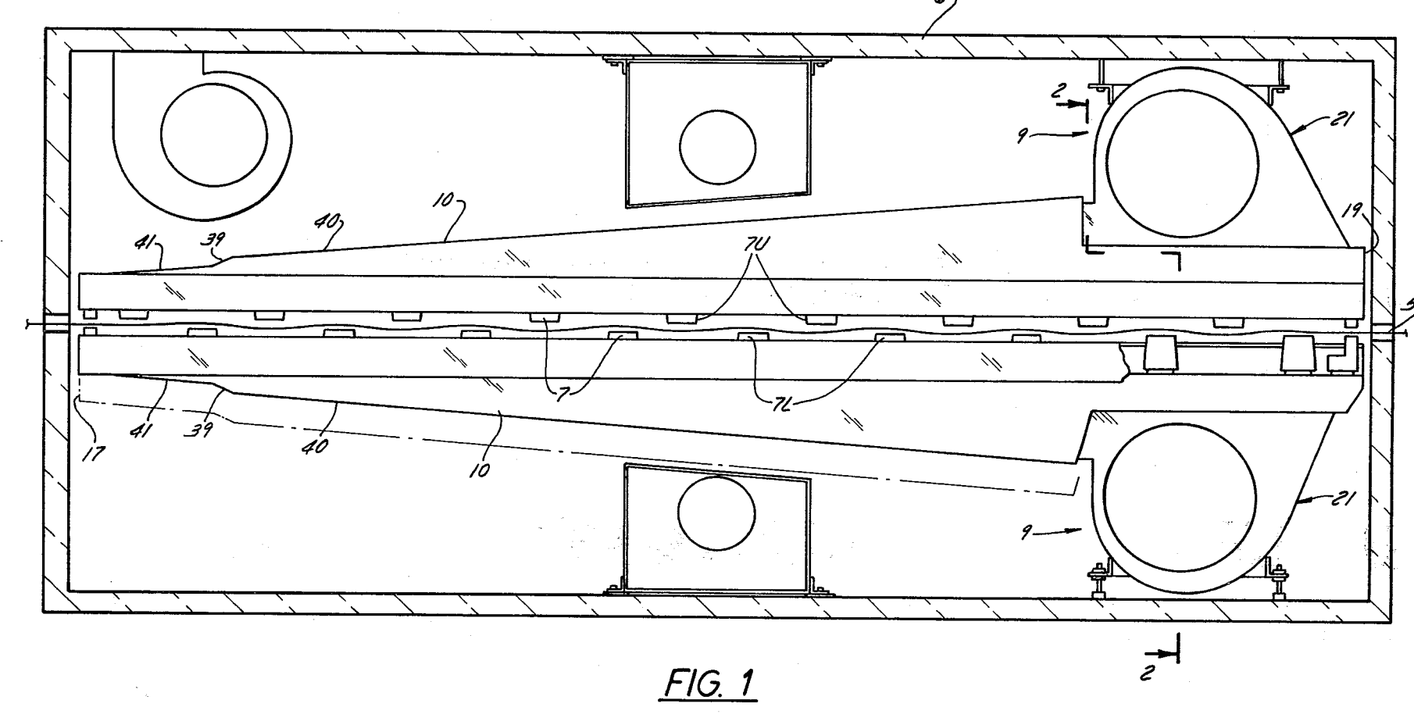
FIG. 1 is a view in side elevation of a pair of air bar assemblies embodying the principles of this invention, cooperating for contactless support of a web as it moves through a dryer enclosure that is shown in vertical section.
Figure 2:
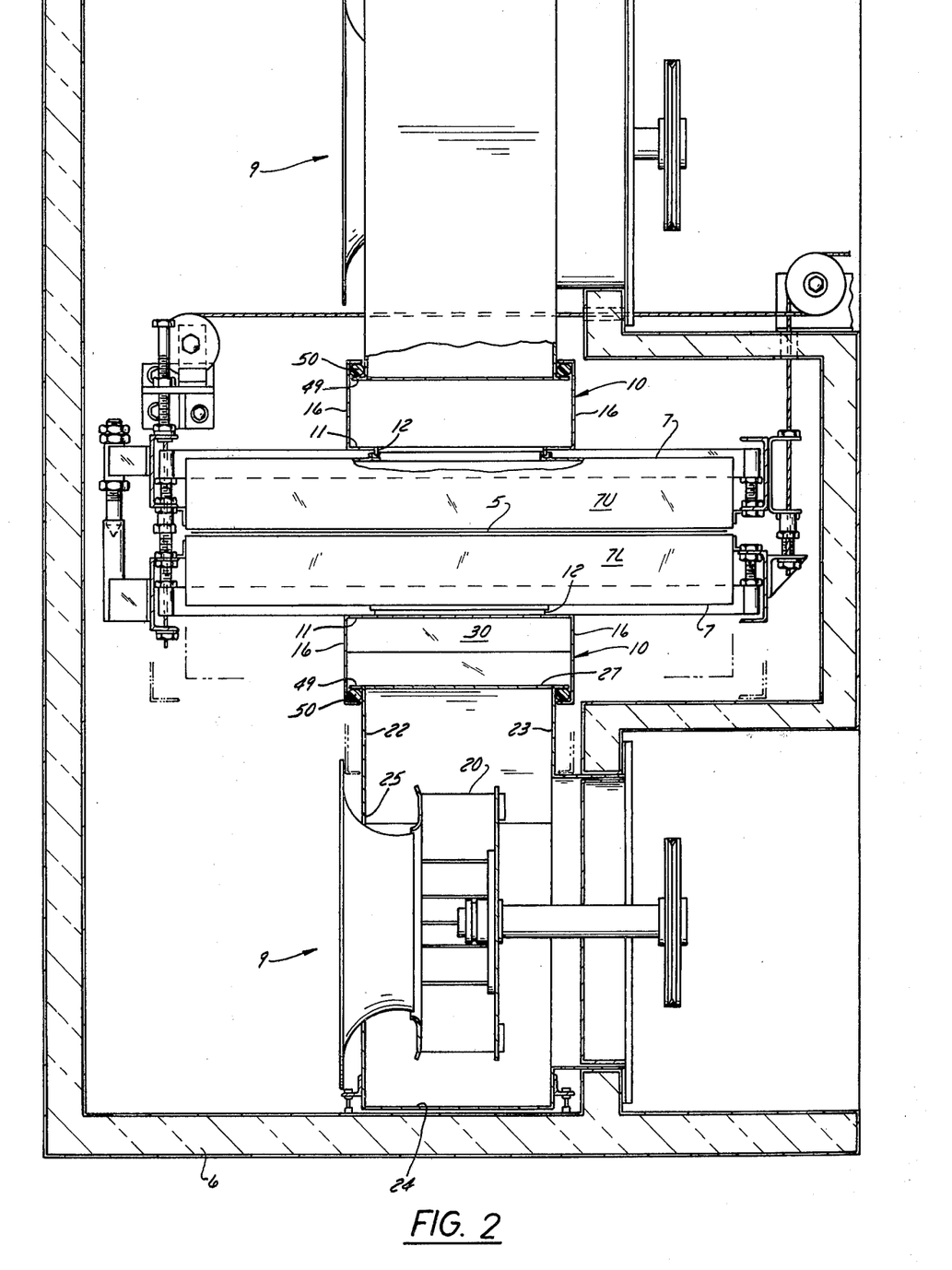
FIG. 2 is a view in section, on an enlarged scale, taken on the plane of the line 2—2 in FIG. 1.

Apparatus of the type to which this invention relates affords contactless support to a freshly imprinted or freshly coated web 5 as it moves lengthwise through an oven or dryer enclosure 6 wherein the web is heated to evaporate solvent from the ink or coating on it. The web 5 extends through the enclosure 6 with its surfaces horizontal, and it is so guided by the contactless support apparatus as to be substantially confined to a predetermined plane that is fixed in relation to the enclosure.

The contactless web supporting apparatus comprises two rows of air bars 7 in the enclosure 6. The air bars 7L of one of said rows are below the plane of the web and have upwardly opening discharge outlets that blow airstreams against the web to levitate it. The air bars 7U of the other of said rows are above the web and are arranged to discharge air downwardly against the web to steady and guide it. Each of the air bars 7 is of a type that is known in itself, as exemplified by the above mentioned Pat. No. 3,873,013. Each air bar 7 extends widthwise across the web, and the several air bars in each row are parallel to the plane of the web as well as parallel to one another and spaced apart at regular intervals in the direction of web motion. Although the airstreams from the air bars confine the web generally to a predetermined plane, the web is in fact slightly undulatory along its length, with about equal deflections to each side of that plane, because the air bars 7U of the row above the web are in staggered relation to the air bars 7L below it, as is generally conventional.

In the contactless web supporting apparatus of this invention, there is a centrifugal fan or blower 9 for each row of air bars, and pressure air is conducted from each blower 9 to the air bars of its row by means of a single elongated header 10 to which all of the air bars in the row are attached.

Figures 6, 7:
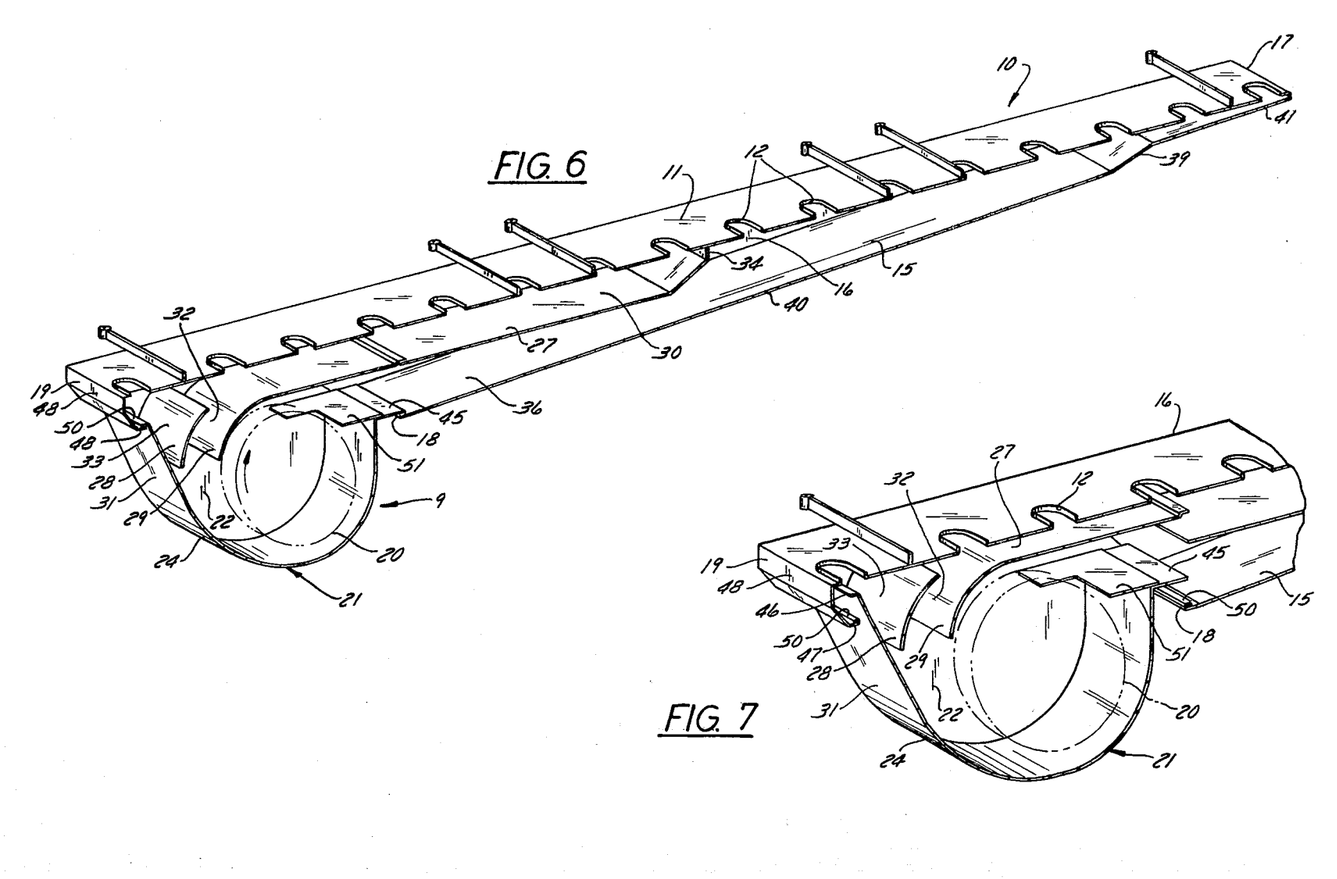
FIG. 6 is a perspective view of the blower and header, taken on the vertical plane containing the longitudinal centerline of the header.
FIG. 7 is an enlarged detail view generally similar to FIG. 6 but showing the blower and the rear portion of the header.

Each header 10 has a ported wall 11 that is parallel to the plane of the web and extends along the full length of an outlet side of the header, that is, its side adjacent to the air bars and the web. At regular intervals all along its length the ported header wall 11 as outlet ports 12, one for each air bar 7 in the row supplied by the header. Each outlet port 12 is preferably racetrack shaped (as best seen in FIG. 6), with its length extending widthwise of the header. The ported wall 11 is adjacent to the side of each air bar 7 that is remote from the web, and the communication between each outlet port 12 and the interior of its air bar is midway between the ends of the air bar, so that the pressure air delivered from the single header 10 flows symmetrically along the air bar.

Opposite its ported wall 11, at an inlet side of the header 10, it has a flow controlling wall 15. The opposite walls 11 and 15 of the header are connected by flat, parallel side walls 16. The flow controlling wall 15 is substantially shorter than the header 10 as a whole, the front end of that wall being at the front end 17 of the header but its rear end 18 being spaced a substantial distance forwardly from the rear end 19 of the header to accommodate the blower 9.

For simplicity the header is illustrated as having each of its walls 11, 15 and 16 formed in one piece, but it will be understood that the header can be made in two or more lengthwise adjacent sections that are connected by slip joints which accommodate thermal expansion and contraction.

The blower 9 for each row of air bars is at the inlet side of its header 10, that is, the side of the header that is remote from the air bars, and it is near the rear end of its header.

Each blower 9 comprises a cylindrical or drumlike rotor 20 and a housing 21. The blower rotor 20 is spaced inwardly from the ported wall 11, and its axis is parallel to the lengths of the air bars. It rotates in the direction such that its side nearest the ported wall 11 moves forwardly.

The blower housing 21 comprises a pair of substantially flat side walls 22 and 23 that are connected by a scroll wall 24. The housing side walls 22 and 23 are substantially parallel to the side walls 16 of the header and are essentially identical to one another in shape except for a large circular hole 25 in the side wall 22, concentric with the rotor 20 and through which air is drawn into it. The scroll wall 24 has a front end at the rear end 18 of the flow controlling wall 15, whence it curves rearwardly partway around the rotor 20 in a spiral arc of gradually increasing radius, then extends obliquely rearwardly and towards the ported wall 11 to have its rear end at the rear end 19 of the header.

It will be apparent that the blower 9 tends to discharge pressure air in a direction generally transverse to the length of the header and outwardly towards the ported wall 11. Nevertheless, an internal wall 27 and a curved guide vane 28 cooperate with walls of the header 10 and with the blower housing 21 to so guide and distribute pressure air issuing from the blower that there is a uniform, steady, non-surging outflow of air at the proper rate and pressure from all of the outlet ports 12 along the length of the header, particularly including those that are near the rear end of the header and substantially opposite the blower.

The internal wall 27 extends forwardly across the blower rotor 20 and a substantial distance beyond the front end of the blower housing, having its front portion between the ported wall 11 and the flow controlling wall 15 and having its rear portion between the ported wall and the rotor. Along most of its length the internal wall 27 is straight and flat, but its rear end portion 29 is curved substantially concentrically inwardly around the rotor to project a short distance into the blower housing 21, and it has an outwardly bent front end portion 34 that is connected with the ported wall 11 at a location between outlet ports 12. Since the internal wall 27 is wide enough to extend across the full width of the header, with its side edges contiguous to the header side walls 16, it cooperates with the ported wall 11 and the header side walls 16 to define an inner plenum chamber 30 through which pressure air is delivered to those outlet ports 12 that are opposite the blower and some distance forward from it. The length of the inner plenum chamber is such that it extends through at least about one-third of the total length of the header and not more than about one-half of its length. Typically, in a header having ten outlet ports, five will open from the internal plenum chamber; and with sixteen outlet ports, seven will open from that chamber.

As shown, the internal wall 27 is parallel to the ported wall 11, but it could be at a forwardly convergent oblique angle to the ported wall so that the inner plenum chamber 30 tapers forwardly along its length. However, completely satisfactory pressure air distribution has been obtained with the more easily fabricated untapered chamber.

The rear edge of the internal wall 27 is spaced forward from the obliquely extending rear portion 31 of the blower housing scroll wall 24, and the guide vane 28 is interposed between said rear portion 31 of the scroll wall and the curved rear portion 29 of the internal wall 27, spaced from both of them. The guide vane 28, which is curved concentrically to the axis of the rotor 20 and thus also to the curved rear portion 29 of the internal wall, is fixed in the blower housing by having its side edges suitably secured to the housing side walls 22 and 23.

The guide vane 28 cooperates with the oblique rear portion 31 of the scroll wall to define a divergent passage 33 which opens to the rearmost outlet port 12 in the ported wall 11 and through which a small portion of the blower air is conducted to that one outlet port. The guide vane 28 also cooperates with the curved rear portion 31 of the internal wall 27 to define a curving inlet passage 32 through which a larger portion of the air thrown outwardly from the rotor 20 is constrained to enter the inner plenum chamber 30. The major portion of the air discharged from the blower flows along the passage 36 between the internal wall 27 and the flow controlling wall 15 and thus into the substantially long portion of the header that is forward of the inner plenum chamber 30. To ensure a smooth, steady flow of air into the passage 36, there is a flat plate 51 in the blower housing that constitutes, in effect, a rearward extension of the flow controlling wall 15 to near the periphery of the rotor 20. This same plate 51 has an extension 51a which projects partway across the inlet end of the rotor to block feedback of air from the rotor periphery to its interior.

It will be observed that the arrangement of this invention is unusual in that its blower 9 has three outlets. Ordinarily it could be expected that irregular, surging or pulsing outflow would result from providing plural outlets that were merely spaced from one another circumferentially around the rotor, but in this case the outlets are radially spaced at different distances from the rotor as well as being circumferentially spaced around it. Thus the outlet 33, comprising the short passage leading to the rearmost outlet port 12, is farthest radially from the rotor, and, insofar as it is defined by the oblique rear portion 31 of the scroll wall, it is the first of the three outlets in the direction of rotor rotation. Serving only one outlet port, it receives the smallest rate of air flow. The curved outlet 32 that leads to the inner plenum chamber 30, which is the next one in the direction of rotor rotation, is at an intermediate distance from the rotor and receives a substantially greater air flow than the passage 33 but less than the passage 36 that leads to the long front portion of the header. Finally, the outlet comprising passage 36, by virtue of the plate 51, is the third one in the direction of rotor rotation and is closest radially to the rotor.

Although the header 10 functions as a plenum chamber, air flows through it as a stream with substantial velocity. Therefore, to promote uniformity of pressure air flow at all of the several outlet ports 12 in the header 10 that are forward of the inner plenum chamber 30, the flow controlling wall 15 extends, generally speaking, in oblique, forwardly convergent relationship to the ported header wall 11, so that the header has a forward taper.

If the header 10 were tapered uniformly all along its length, the airflow from one or a few air bars near the front end of the header would not be uniform with the airflow from other air bars along its length. To prevent this without at the same time creating problems at said other air bars along it, the header 10 has a markedly increased taper through a short step zone 39 that is spaced from its front end by a distance equal to a minor portion of its length and is located just behind those outlet ports 12 from which higher pressure air would issue if the header had a uniform taper along its length.

To define the taper in the step zone 39 and in the portions of the header 10 that are forward and rearward of it, the flow controlling wall 15 has a flat major portion 40 which extends from its rear end 18 forward to the step zone 39 and which, along its length, is substantially uniformly and gradually forwardly convergent towards the ported wall 11. A flat minor portion 41 of the wall 15, extending from the step zone 39 forward to the front end 17 of the header, is likewise gradually forwardly convergent towards the ported wall 11 but is in inwardly offset relation to the major wall portion 40 and has a slightly lesser convergence towards the ported wall. The relatively very short portion of the wall 15 that is in the step zone 39 is inclined in relation to the rear and front portions 40 and 41 of that wall to have a substantially more abrupt forward convergence towards the ported wall 11.

At the step zone 39, therefore, the stream of air flowing forwardly through the header 10 is rather abruptly accelerated, with a consequent decrease in the static pressure in the header forward of the step zone.

The flow controlling wall 15 can be formed of one thickness of sheet metal, as shown, with a pair of opposite obtuse-angle bends at the step zone 39; or the step zone and the gradually tapered portion forward of it can be defined by a separate insert in the header.

As pointed out hereinabove, at least one of the two rows of air bars 7U and 7L by which a web is supported should be retractable to a position spaced from the plane of the web, to facilitate threading the web through the dryer enclosure 6. Since the blowers for all of the air bar assemblies are stationarily mounted in accordance with the principles of this invention, both air bar assemblies for each web could be retractable so far as space considerations alone are concerned. However, there is some cost advantage if only one row of air bars for each web is made retractable, particularly in saving the cost of the actuating mechanism for effecting extension and retraction of the air bars, which mechanism can be of the general type disclosed in U.S. Pat. No. 3,739,491. In the case of a stacked web arrangement having parallel upper and lower webs 5T and 5B extending through the dryer, the preferred arrangement is for the air bar assemblies between the two webs to be stationary, while the retractable air bar assemblies are those that comprise the upper row of air bars 7U for the upper web 5T and the lower row of air bars 7U for the lower web 5B.

In any case, for retraction of air bars in a row associated with any one blower, the header 10 for that row of air bars is bodily movable relative to the blower housing 21, and the blower 9 remains stationary. The internal wall 27 effectively constitutes a part of the header and moves along with the header walls to which it is connected. The header retracts with a translatory motion, and the distance through which it retracts is substantially equal to the normal spacing between the blower rotor 20 and the internal wall 27, which distance affords adequate space for web threading. The curved guide vane 28, which is fixed in the blower housing, has its outlet-end edge spaced from the ported wall 11 by a distance substantially equal to that through which the header retracts, and therefore it does not interfere with header retraction.

Figures 3, 5, 8:
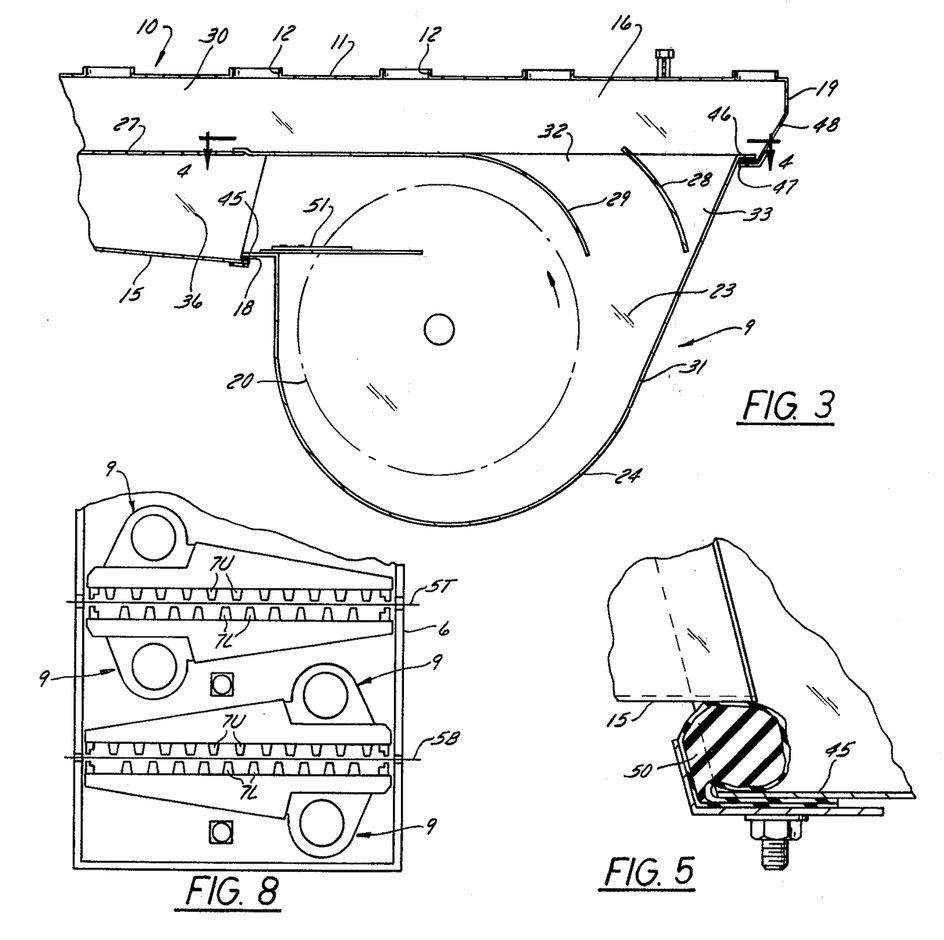
FIG. 3 is a detail view in vertical section, on the plane of the longitudinal centerline of the air bar assembly, showing the blower and the rear end portion of the header.
FIG. 5 is an enlarged scale detail view in transverse section through a portion of the air seal between the blower housing and the header.
FIG. 8 is a more or less diagrammatic view in side elevation illustrating how air bar assemblies of this invention can be arranged in stacked relationship in a dryer enclosure for contactless support of a plurality of webs.
Figure 4:
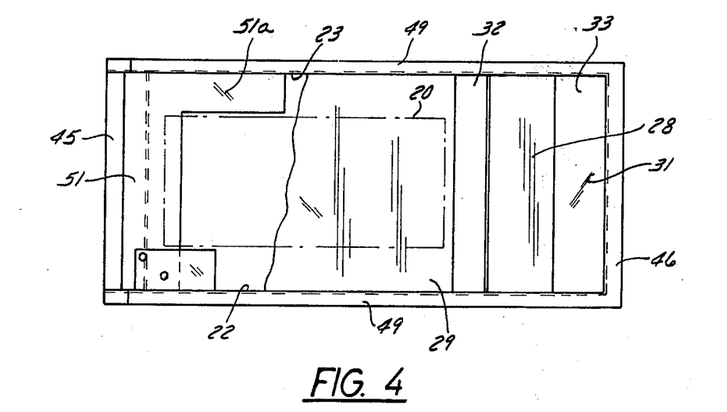
FIG. 4 is a view in section, taken substantially on the plane of the line 4—4 in FIG. 3.

To provide an air seal between the blower housing and the header when the latter is in its operative position, the housing and header are provided with interengaging lips or flanges, the flanges on one of them projecting outwardly and those on the other projecting inwardly. Thus, a forwardly projecting flange 45 on the front end portion of the blower housing scroll wall 24 normally engages the rear end portion of the inner flow controlling wall 15 of the header, and similarly there is a rearwardly projecting flange 46 on the rear end portion of the scroll wall 24 that normally engages a tab or flange 47 which projects forwardly from the rear end wall 48 of the header. In like manner, outwardly projecting flanges 49 on the side walls 22, 23 of the blower housing engage opposing flanges on the side walls 16 of the header. A resilient sealing element 50 extends all along one of the lips or flanges of each opposing pair to be clampingly engaged by the cooperating flange or lip when the header is in its normal operative position.

Because of the very compact configuration of the air bar assembly of this invention, and particularly because of the slenderness of the front end portion of its header, a stacked arrangement of such assemblies can be accommodated in a multiple-web dryer enclosure that is small in both its height and width dimensions, especially if the two assemblies between vertically adjacent webs are positioned as shown in FIG. 8, with the blower 9 for each such assembly adjacent to the front end of the header 10 of the other assembly.

From the foregoing description taken with the accompanying drawings it will be apparent that this invention provides an air bar assembly for contactless support of a web as it moves lengthwise through a dryer enclosure, which assembly is unusually compact horizontally in that it is not substantially wider than the web itself and is also unusually compact vertically so that it lends itself well to a stacked array for a multiple-web dryer.

What is claimed as the invention is:

1. An air bar assembly by which air is blown against one surface of a lengthwise moving web for contactless confinement of the web substantially to a horizontal plane, comprising a centrifugal blower having a substantially cylindrical rotor, and duct means for directing pressure air from said blower into the interior of each of a plurality of air bars that extend across the width of the web parallel to one another and to said plane and each of which has at least one air discharge outlet opening towards said plane, said air bar assembly being characterized by:
   A. said duct means comprising an elongated ported wall that is parallel to said plane and is at a side of each air bar remote from said plane, said ported wall having its length transverse to the air bars and having outlet ports therein at spaced intervals therealong, one for each air bar, each opening into its air bar intermediate the ends thereof;
   B. said rotor
      (1) being near a rear end of said ported wall,
      (2) being spaced from the ported wall in a direction away from said plane, and
      (3) having its axis substantially parallel to the lengths of the air bars;
   C. an internal wall between the rotor and said ported wall and opposing the latter to cooperate therewith in defining an internal plenum chamber in the duct means from which certain of said outlet ports open, said internal wall
      (1) extending along about one-third to one-half of the length of the ported wall and
      (2) having a rear end portion which curves partway around the rotor in radially spaced relation thereto;
   D. said duct means further comprising a flow controlling wall which has a rear end adjacent to the periphery of the rotor and which extends forwardly to a front end of the ported wall, said flow controlling wall being spaced in said direction from said internal wall and said ported wall and opposing them to cooperate with them in guiding air from the rotor to outlet ports in front of said internal wall; and
   E. an enclosure for said rotor comprising a scroll wall that curves around the rotor at its side remote from the ported wall and extends from the rear end of said ported wall to a rear portion of said flow controlling wall, said scroll wall cooperating with said rear end portion of the internal wall to define an inlet to said plenum chamber for air expelled from the rotor.

2. The air bar assembly of claim 1, further characterized by:
   F. said flow controlling wall being in forwardly convergent relation to said ported wall along substantially the whole of its length.

3. The air bar assembly of claim 1, further characterized by:
   F. said flow controlling wall
      (1) being substantially uniformly and gradually forwardly convergent towards the ported wall
         (a) along a major portion of its length that extends from its rear end to a step zone and
         (b) along a lesser portion of its length that extends from said step zone to its front end, and
      (2) being substantially more abruptly forwardly convergent towards the ported wall in said step zone, which extends through a least portion of its length and at which forwardly flowing air is abruptly accelerated.

4. The air bar assembly of claim 1 wherein said ported wall, said internal wall and said flow controlling wall are connected by opposite substantially parallel side walls that cooperate with them to provide a header element and wherein said enclosure for the rotor further comprises opposite substantially parallel end walls that are connected with said scroll wall and cooperate with it to define a housing element, further characterized by:
   F. said housing element being substantially stationary and said header element being bodily movable substantially towards and from said plane between operative and retracted positions; and
   G. one of said elements having outwardly projecting lips which opposingly cooperate with inwardly projecting lips on the other element to provide an air seal between the elements.

5. An air bar assembly from which air is blown against one surface of a lengthwise moving web for contactlessly confining the web substantially to a horizontal plane, said air bar assembly comprising a centrifugal blower having a substantially cylindrical rotor and a housing, and duct means communicating said blower with each of a plurality of air bars that extend across the width of the web parallel to one another and to said plane, each having at least one air discharge outlet opening towards said plane, said air bar assembly being characterized by:
   A. said duct means comprising an elongated header extending transversely to the air bars and having opposite front and rear ends,
      (1) said header having one wall that extends along substantially its full length and is substantially parallel to said plane and adjacent to each air bar at a side of the air bar remote from said plane, said one wall having therein a plurality of outlet ports, one for each air bar, each opening into its air bar intermediate the ends thereof, and
      (2) said header having an opposite wall which extends along a major portion of the length of the header from its front end, the rear end of said opposite wall being spaced from the rear end of the header;
   B. said blower having its rotor near the rear end of the header and spaced from said one wall in the direction away from said plane,
      (1) the axis of the rotor being parallel to the lengths of the air bars and
      (2) the periphery of the rotor being adjacent to the rear end of said opposite wall;
   C. the housing of said blower comprising a scroll wall that curves partway around the rotor at the side thereof remote from said one wall and extends from a rear end portion of said opposite wall to the rear end of said one wall; and D. an internal wall in said header, spaced between and opposing said walls thereof, said internal wall
   (1) being connected at its front end with said one wall, at a distance of about one-third to one-half the length of the header from the rear end thereof, and cooperating with said one wall to define a plenum chamber in the header from which certain of said outlet ports open, and
   (2) having its rear end portion curved away from said one wall and partway around the rotor, in radially outwardly spaced relation thereto, said rear end portion
      (a) cooperating with the rear end portion of said opposite wall to define an outlet from the blower which is close to the rotor periphery and from which air is conducted to the portion of the header in front of said plenum chamber, and
      (b) being spaced from said scroll wall to define another outlet from the blower which is more distant from the rotor periphery and from which air is conducted into said plenum chamber.

6. The air bar assembly of claim 5 wherein said outlet ports are spaced at substantially regular intervals along the length of said one wall, and one of said outlet ports is near the rear end of said one wall, further characterized by:
   E. a fixed guide vane between said rear end portion of said internal wall and the rear end portion of said scroll wall, curved partway around the rotor substantially concentrically thereto, said guide vane cooperating with the rear end portion of said internal wall to define said other outlet from the blower and cooperating with the scroll wall to define a further outlet from the blower that leads to said one outlet port.

7. The air bar assembly of claim 5, further characterized by:
   E. said header having a pair of further walls that are substantially parallel to one another and are both connected with said one wall, said opposite wall and said internal wall and cooperate with them to define a header element that is movable towards and away from said plane between operative and retracted positions;
   F. said housing comprising a pair of substantially parallel end walls that are both connected with said scroll wall and cooperate with it to define a stationarily mounted housing element in which the rotor rotates on a fixed axis; and
   G. one of said elements having outwardly projecting lips around edge portions thereof that oppose inwardly projecting lips around edge portions of the other element to provide an air seal between the elements when the header element is in its operative position.

8. An air bar assembly by which air is blown against one surface of a lengthwise moving web for contactless confinement of the web substantially to a horizontal plane, comprising a centrifugal blower having a substantially cylindrical rotor, and duct means for directing pressure air from said blower into the interior of each of a plurality of air bars that extend across the width of the web parallel to one another and to said plane and each of which has at least one air discharge outlet opening towards said plane, said air bar assembly being characterized by:
   A. said duct means comprising an elongated ported wall that is parallel to said plane and is at a side of each air bar remote from said plane, said ported wall having its length transverse to the air bars and having outlet ports therein at spaced intervals therealong, one for each air bar, each opening into its air bar intermediate the ends thereof;
   B. said rotor
      (1) being near a rear end of said ported wall,
      (2) being spaced from the ported wall in a direction away from said plane,
      (3) having its axis substantially parallel to the lengths of the air bars, and
      (4) being rotatable in the direction such that its side adjacent to said ported wall moves towards the front end thereof;
   C. said duct means further comprising
      (1) an internal wall defining an internal plenum chamber from which open at least a substantial majority of the outlet ports in the rear one-third to one-half of said ported wall and
      (2) an external wall cooperating with said internal wall and said ported wall to define a passage along which air can move from the rotor to outlet ports forward of the internal plenum chamber; and
   D. wall means cooperating with said duct means to define a blower housing for said rotor and comprising
      (1) a wall portion having an edge adjacent to the rotor periphery and defining a first outlet for air discharged from said rotor, opening to said passage at a rear end thereof, and
      (2) another wall portion having an edge portion spaced at a greater radial distance from the rotor than said edge of the first mentioned wall portion and spaced circumferentially from the latter in the direction of rotor rotation, defining a second outlet for air discharged from the rotor that opens into a rear end of said internal plenum chamber.

* * * * *